(12) United States Patent
Naruse et al.

(10) Patent No.: US 6,944,686 B2
(45) Date of Patent: Sep. 13, 2005

(54) DATA TRANSFER CONTROL CIRCUIT WITH TERMINAL SHARING

(75) Inventors: Takanobu Naruse, Nagoya (JP);
Shinichi Yoshioka, Koganei (JP); Norio Nakagawa, Tokyo (JP)

(73) Assignees: Renesas Technology Corp., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 354 days.

(21) Appl. No.: 10/255,024

(22) Filed: Sep. 26, 2002

(65) Prior Publication Data

US 2003/0070011 A1 Apr. 10, 2003

(30) Foreign Application Priority Data

Oct. 4, 2001 (JP) ........................................ 2001-308691

(51) Int. Cl.⁷ .............................................. G06F 13/28
(52) U.S. Cl. ............................ 710/39; 710/19; 710/305
(58) Field of Search ........................ 710/15, 19, 22–28, 710/36, 39, 45, 117, 124, 305, 5–7, 52, 54

(56) References Cited

U.S. PATENT DOCUMENTS 4,270,167 A * 5/1981 Koehler et al. ............. 710/112
5,781,799 A * 7/1998 Leger et al. ................. 710/22
5,828,901 A * 10/1998 O'Toole et al. .............. 710/22
6,049,842 A * 4/2000 Garrett et al. ............... 710/33

* cited by examiner

Primary Examiner—Ilwoo Park
(74) Attorney, Agent, or Firm—Miles & Stockbridge PC (57) ABSTRACT

A DMA controller including a request queue for holding DMA transfer requests clears only the request queue without executing unnecessary DMA transfers and provides information about the states of the queue. A DMA controller is configured to enable data transfer control with respect to plural channels and includes a request queue capable of holding the identification information of channels concerned in plural data transfer requests, wherein the states of the request queue can be outputted and information held in the request queue can be cleared.

9 Claims, 11 Drawing Sheets

DATA TRANSFER CONTROL CIRCUIT WITH TERMINAL SHARING

BACKGROUND OF THE INVENTION

The present invention relates to DMA (direct memory access) data transfer technology in a microcomputer system and technology effectively applied to a method for controlling queues for temporarily holding DMA transfer requests. It relates to technology effectively used for a DMA (direct memory access) controller or DMA control circuit incorporated in, e.g., a microprocessor or microcomputer.

In a system using a one chip microcomputer including a central processing unit (hereinafter referred to as CPU), and peripheral modules such as a timer circuit and a serial communication interface circuit, a DMA controller is used to enable data to be directly transferred between a memory and peripheral devices without involvement of the CPU. The DMA controller, which is sometimes configured as an LSI distinct from a microcomputer, is recently often incorporated in a microcomputer and microprocessor. Such a DMA controller may be provided with an FIFO (First In First Out) memory called a request queue in order that a next DMA transfer request can be accepted during execution of a DMA transfer.

SUMMARY OF THE INVENTION

Since a conventional DMA (direct memory access) controller is not provided with a function for clearing a request queue, DMA transfers terminate with transfer requests remaining in the request queue. This phenomenon is called an underrun. In this case, since DMA transfers that would be otherwise unnecessary must be executed to cancel the DMA transfer requests remaining in the request queue, system throughput will decrease. In addition, since a conventional DMA controller is not provided with a function for getting the contents of the request queue, an overrun may have occurred in an attempt by peripheral devices to execute more DMA transfer requests than held in the request queue.

To prevent such underrun and overrun, for example, peripheral devices to make DMA transfer requests must be provided with a circuit such as a counter for counting an output count of DMA transfer requests. As a result, disadvantageously, a user's design burden becomes greater and the size of peripheral logic circuits becomes larger, so that the system becomes more complicated and costlier.

On the other hand, a conventional DMA controller is provided with a function for resetting internal registers and the like, and the reset function can be used to clear all request queues provided correspondingly to plural transfer channels. However, this clear operation causes control registers and the like of the DMA controller to be reset as well. Accordingly, there has been a problem in that, in continuous execution of DMA transfers, DMA transfer processing slows down because clearing the request queues requires the setting of the control registers to be retried.

An object of the present invention is to provide a data transfer control circuit (DMA controller) or a data processor such as a microprocessor incorporating it that can clear only the request queues to perform DMA transfer processing without retrying the setting of control registers. Another object of the present invention is to provide a data transfer control circuit or a data processor incorporating it that can clear the request queues without executing unnecessary DMA transfers to increase system throughput.

Another object of the present invention is to provide a data transfer control circuit or a data processor incorporating it that can avoid DMA transfers from terminating with transfer requests remaining in the request queues without provision of a circuit such as a counter for counting an output count of DMA transfer requests, thereby relieving the user of heavy design burden and preventing the system from becoming complicated.

Another object of the present invention is to provide a highly versatile data transfer control circuit or a data processor incorporating it that can accept DMA transfer requests from external devices having no new specifications on a DMA transfer request interface.

The aforementioned objects and other objects and novel characteristics of the present invention will become apparent from the present specifications and the accompanying drawings.

Typical inventions of those disclosed by the present patent application are described briefly. That is, in a data transfer control circuit that controls data transfers between a memory and peripheral circuits or peripheral devices without involvement of a central processing unit, data transfer control can be performed with respect to plural channels, queues capable of holding plural data transfer requests are provided, and the states of the queues can be outputted.

According to the above described means, peripheral devices to make DMA transfer requests can get in advance the states of the request queues, so that an underrun and overrun can be avoided without provision of a circuit such as a counter for counting an output count of DMA transfer requests. If the system is configured so that the states of the queues are outputted from the above described external terminal by a signal produced by encoding a signal indicating the state of each stage of the queues, and is outputted in time-sharing mode, using an external terminal shared with an external terminal for outputting channel identification information, the number of terminals can be reduced.

A second invention of the present patent application is a data transfer control circuit that controls data transfers between a memory and peripheral circuits or peripheral devices without involvement of a central processing unit, wherein data transfer control can be performed with respect to plural channels, queues capable of holding the identification information of plural channels concerned in data transfer requests are provided, and the contents of the queues can be cleared.

According to the above described means, DMA transfer processing can be performed without retrying the setting of control registers and the queues can be cleared without performing unnecessary DMA transfers. As a result, system throughput is increased. Also, without providing a circuit such as a counter for counting an output count of DMA transfer requests, to peripheral devices as DMA transfer request sources, termination of DMA transfers is prevented with transfer requests remaining in the queues. This relieves the user of heavy design burden and prevents the system from becoming complicated.

As a means for clearing the above described queues, for example, an external terminal for inputting a signal for clearing the contents of the queues may be provided. In this case, if the signal for clearing the contents of the queues is inputted in time-sharing mode, using an external terminal shared with an external terminal for inputting a signal requesting a data transfer, the number of terminals can be reduced.

Also, as a means for clearing the queues, there may be provided a register in which the identification information of channels to be cleared from the queues can be set according to a program. Thereby, the queues can be cleared by any of hardware and software.

DETAILED DESCRIPTION OF THE PREFERRED EMBODIMENTS

Figure 1:
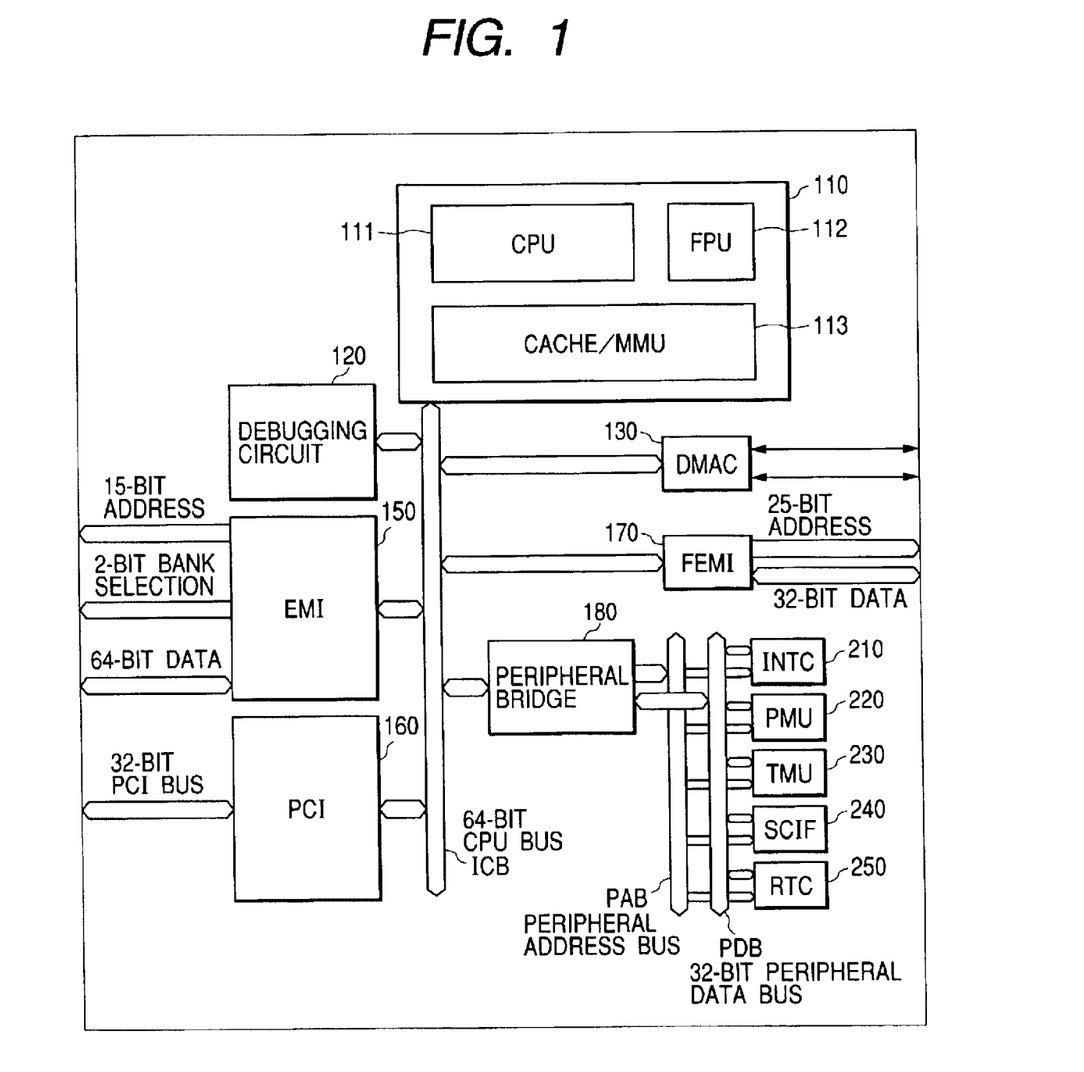
FIG. 1 is a block diagram schematically showing the configuration of an embodiment of a microprocessor provided with a DMA controller to which the present invention is applied.

Hereinafter, preferred embodiments of the present invention will be described with reference to the drawings. FIG. 1 schematically shows the configuration of an embodiment of a microprocessor provided with a DMA controller to which the present invention is applied. Although there is no particular limitation, circuit blocks shown in FIG. 1 are formed on one semiconductor chip such as a monocrystalline silicon by known semiconductor integrated circuit manufacturing technology.

As shown in FIG. 1, the microprocessor of this embodiment comprises: a control part 110 comprising a central processing unit (CPU) 111 of a program control system that interprets program instructions, performs data operations, and controls the whole chip; a floating point unit (FPU) 112 that performs floating point operations and other operations instead of the CPU; and a cache memory and memory management unit 113 that manages a cache memory used to temporarily store data such as a program executed by the CPU, and other memories; a debugging circuit 120 having the function of emulating user programs; a DMA controller (DMAC) 130 that performs DMA-based data transfer control between an external peripheral device such as an external hard disk drive, and an external memory without involvement of the CPU 111; an external memory interface circuit (EMI) 150 for inputting and outputting signals to and from a memory dedicated external bus to which an external memory such as synchronous DRAM (Dynamic Random Access Memory) is connected; a PCI interface circuit (PCI) 160 for inputting and outputting signals to and from a PCI bus to which an external device such as a hard disk drive is connected; and an external flash memory interface circuit (FEMI) 170 for inputting and outputting signals to and from an external bus to which a flash memory and the like are connected. These circuits are connected with each other through a high-speed 64-bit internal CPU bus ICB. The DMA controller (DMAC) 130 includes a function to perform data transfer with an external memory and an external device connected to the above described three external buses without CPU involvement.

The microprocessor of this embodiment is provided with peripheral circuits such as: an interrupt controller (INTC) 210 for presenting an interrupt request to the CPU, based on the occurrence of a predetermined interrupt factor; a power management unit (PMU) 220 that has a clock generating circuit and reduces power consumption by suspending the operation of some circuit blocks within the chip in a predetermined operation mode; a timer unit (TMU) 230 for time management; a serial communication interface (SCIF) 240 for performing serial communication with external devices; and a real-time clock circuit (RTC) 250 that forms a clock required for internal operations and includes a calender function. These peripheral circuits are connected through a peripheral address bus PAB and a peripheral data bus PDB.

The microprocessor of this embodiment is provided between the CPU bus ICB and the peripheral buses PAB and PDB with a peripheral bridge circuit 180 comprising a bus state controller BSC and the like that adjust the timing of signals on two buses to bridge the signals between the CPU and the peripheral modules.

Figure 2:
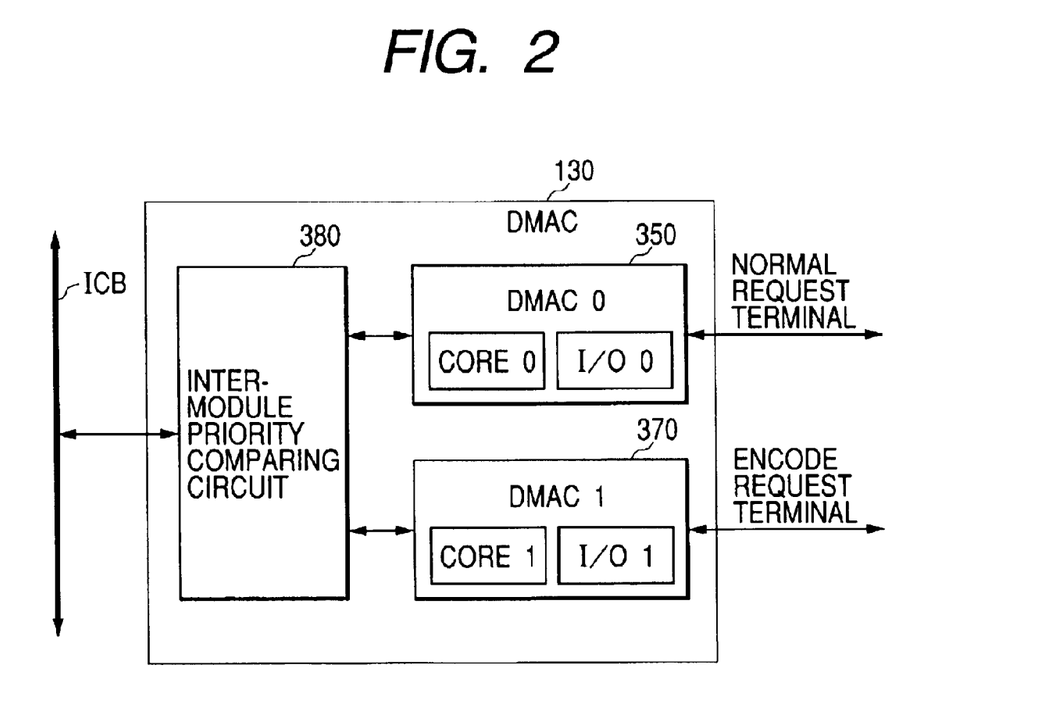
FIG. 2 is a block diagram schematically showing the configuration of the DMA controller.

FIG. 2 schematically shows the configuration of the DMA controller (DMAC) 130. As shown in the drawing, the DMA controller (DMAC) 130 in this embodiment comprises: a first DMAC module 350 that receives a request on a channel basis and performs normal DMA transfer control; a second DMAC module 370 that performs DMA transfer control upon receipt of a channel-specifying request; and an inter-module priority comparing circuit 380 that decides the order of DMA transfers to be executed for transfer requests that occur almost simultaneously in the two DMAC modules 350 and 370. The functions of the first DMAC module 350 are those provided in conventional DMAC controllers. The existence of the first DMAC module 350 makes it possible to configure a system that can accept DMA transfer requests from external devices having no new specifications on a DMA transfer request interface.

The DMAC modules 350 and 370 each are provided with registers for setting priority among channels as described later. By this configuration, when transfer requests arrive at the same time from plural channels, the transfer requests are supplied from the modules to the inter-module priority comparing circuit 380 according to a preset priority, and upon concurrent receipt of the transfer requests from the two DMAC modules 350 and 370, the inter-module priority comparing circuit 380 judges priority between the modules and starts DMA transfer according to the priority. To set priority between the modules, for example, a priority-settable register may be provided within the inter-module priority comparing circuit 380 so that the CPU 111 sets priority in advance.

As described above, the DMAC modules 350 and 370 are placed under control of the inter-module priority comparing circuit 380, and DMA transfer of plural channels is performed according to priority. By this configuration, when a microprocessor including more channels is newly developed, the order of DMA transfers of all the channels can be controlled simply by increasing the number of DMAC modules and slightly changing the logic of the inter-module priority comparing circuit 380.

The DMAC modules 350 and 370 comprise DMAC core parts CORE0 and CORE1, and input-output control parts I/O0 and I/O1, respectively. The input-output control part I/O1 of the second DMAC module 370 is provided with a request queue RQ10. In the request queue RQ10, channels numbers are successively stored as the identification information of channels from which transfer requests are issued.

The DMA modules DAMC0 and DAMC1 are constituted as IP (Intellectual Property) data, respectively. IP data is designed as one unified circuit and stored in a database or the like; when an LSI requiring a circuit of an identical function is developed, data already designed is retrieved from the database and combined with other circuits to achieve a desired function.

Figure 12:
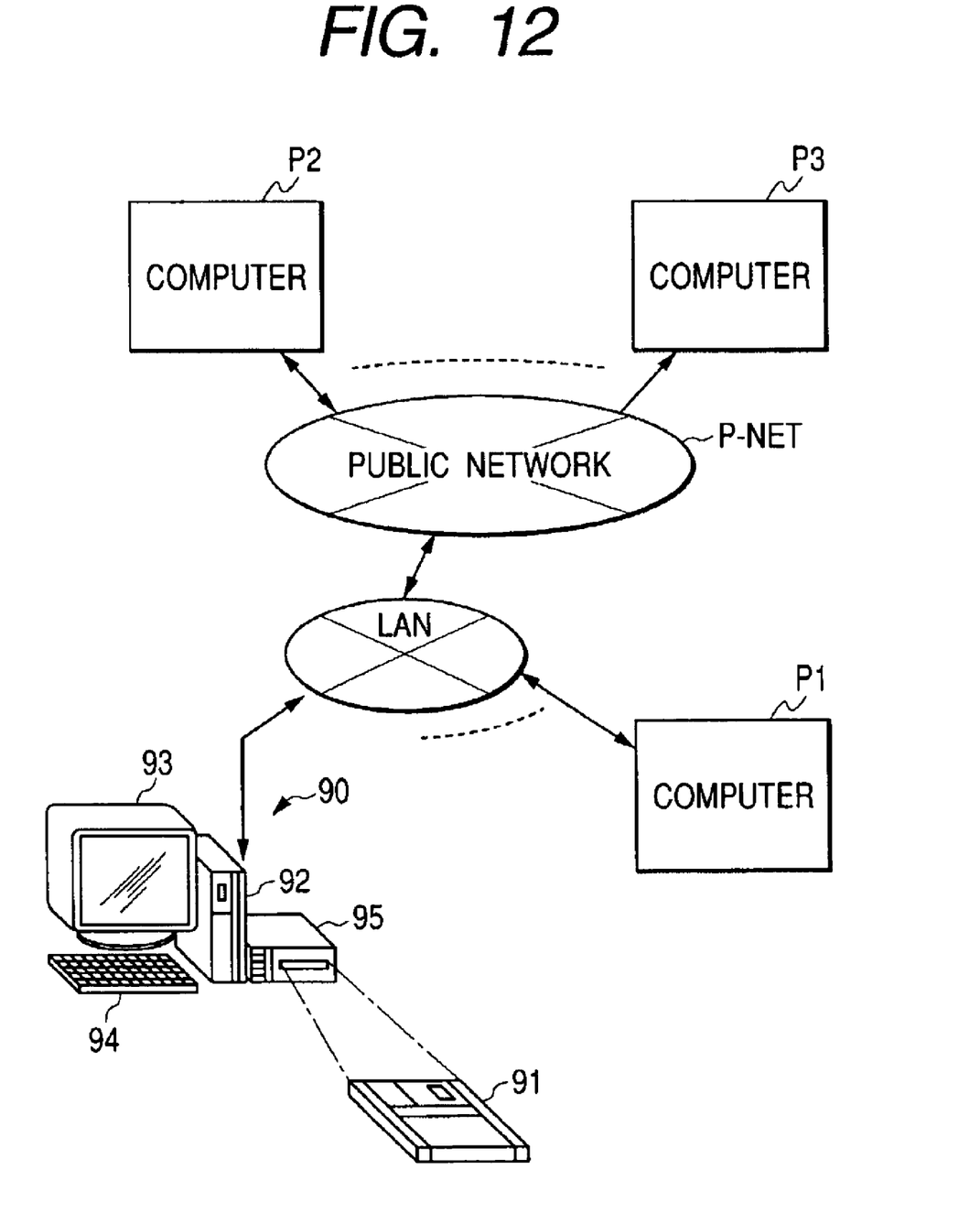
FIG. 12 is a diagram for explaining an example of data distribution in a case where DMAC core parts constituting a DMA controller are transformed into IPs so that they are used for the design of an LSI.

By thus transforming the modules DAMC0 and DMAC1 into IP (Intellectual Property), respectively, for example, as shown in FIG. 12, in a computer system comprising a computer body 92, a monitor device 93 such as CRT (Cathode Ray Tube), an input device 94 such as keyboard, and an external storage device 95 such as a MO (Magneto Optic) drive unit, storage media 91 such as a magneto-optical disk in which IP data is recorded are mounted in the external storage device 95 to retrieve data, and the data is transmitted to another computer P1 within the area through a local area network LAN and to other computers P2 and P3 outside the area through a public communication network P-NET, so that LSI design can be simplified and service can be provided so that the IP data is distributed to desiring third parties on a chargeable basis to earn profits.

Figure 3:
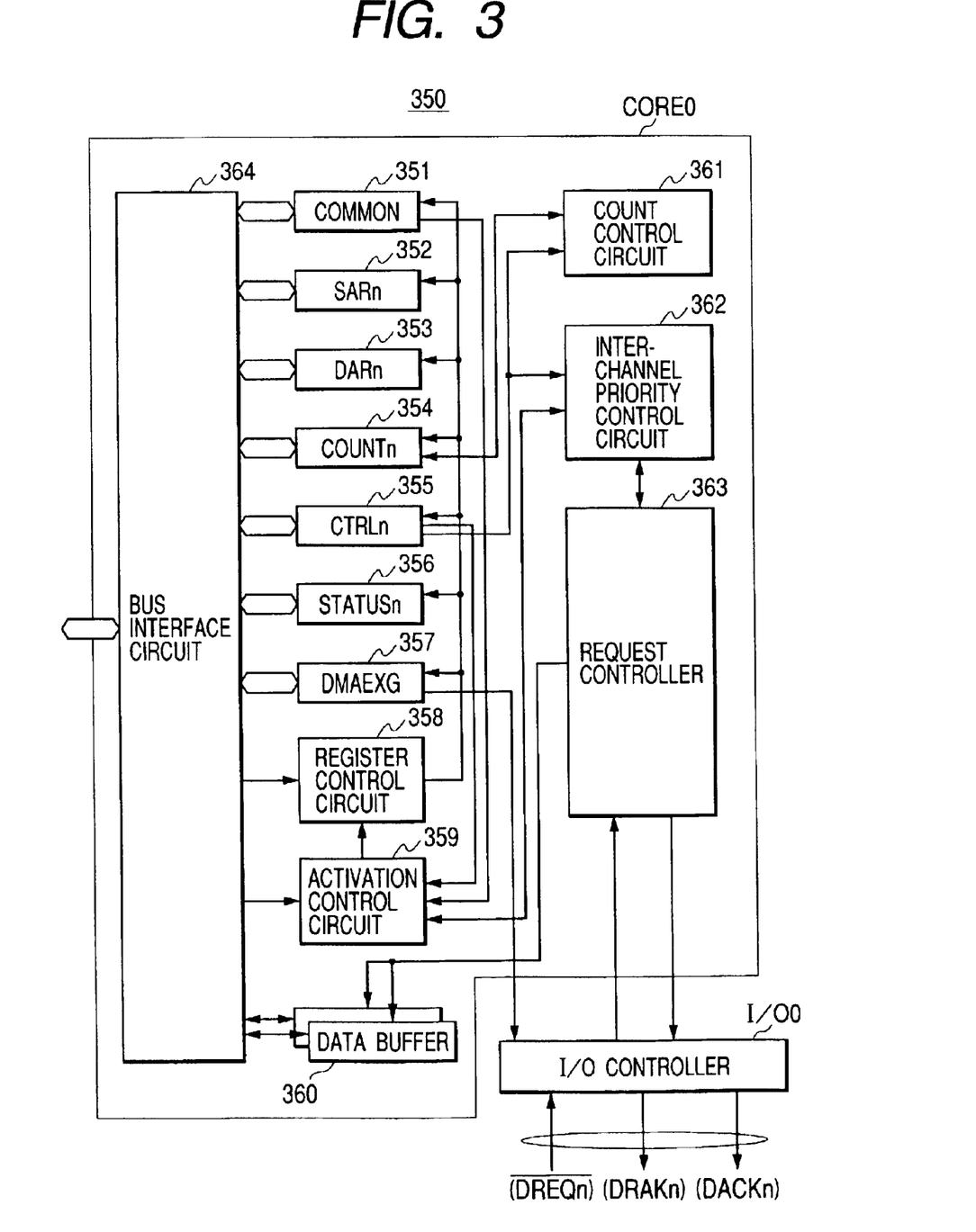
FIG. 3 is a block diagram showing a more detailed configuration of a first DMAC module constituting the DMA controller of a preferred embodiment.

FIG. 3 shows a more detailed configuration of the first DMAC module 350. The first DMAC module 350 includes plural (n) channels capable of DMA transfer independent of each other, and to enable the acceptance of DMA transfer requests on a channel basis, has an input-output control part I/O0 provided with input terminals for accepting n DMA transfer request signals/DREQ1 to /DREQn (/denotes that a low level is effective), output terminals for outputting n acknowledge signals DRAK1 to DRAKn corresponding to the channels for informing the outside that a request has been accepted, and n acknowledge signal output terminals DACK1 to DACKn for outputting a completion signal to an external device at termination of DMA transfer with respect to a requested channel.

The DMAC core part CORE0 of the DMAC module 350 is provided with: a common register (COMMON) 351 for setting master enable for enabling or disabling transfer requests of all channels and for performing settings common to all channels such as deciding priority among the channels; source address registers (SAR1 to SARn) 352 to which transfer source addresses are inputted correspondingly to the channels; destination address registers (DAR1 to DARn) 353 to which transfer destination addresses are inputted correspondingly to the channels; count registers (COUNT1 to COUNTn) 354 for holding a transfer count for each channel; control registers (CTRL1 to CTRLn) 355 for specifying which of read and write operations to execute, a transfer method, transfer size, operation mode, and the like for each channel; status registers (STATUS1 to STATUSn) 356 to reflect the status of respective channels; and an I/O control register (DMAEXG) 357 common to all channels that has a bit for specifying whether to assert a DMA transfer completion signal DACKn by data transfer (read) from a source address or data transfer (write) to a destination address and performs setting on input and output of external signals.

Moreover, the DMAC core part CORE0 of the DMAC module 350 is provided with: a register control circuit 358 for controlling these registers; an activation control circuit 359 for triggering the register control circuit 358 to start DMA transfer control; a data buffer 360 having a storage capacity of e.g., 32 bytes to temporarily hold data inputted or outputted during DMA transfer; a count control circuit 361 for referring to a transfer size within the control register 355 and updating the values of the count registers 354; an inter-channel priority control circuit 362 for deciding which channel to preferentially perform data transfer; a request controller 363 for controlling the whole circuit within the core; and a bus interface circuit 364 that connects the above described registers and the internal CPU bus ICB, and performs data transfer control according to control of the inter-channel priority control circuit 362. Settings of these registers can be performed from the CPU 11 through the internal bus ICB, as well as from external devices through the external bus.

Figure 4:
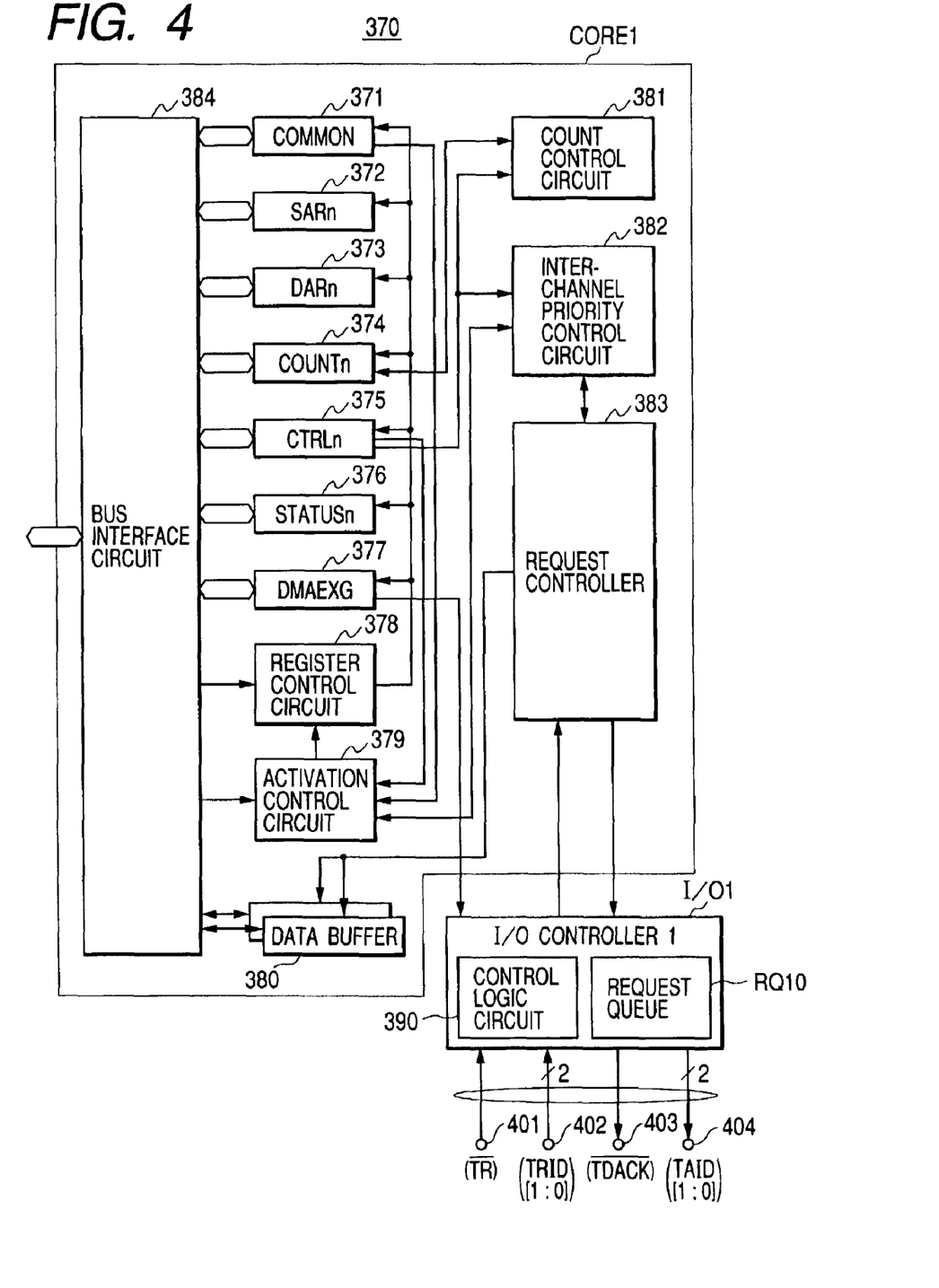
FIG. 4 is a block diagram showing a more detailed configuration of a second DMAC module constituting the DMA controller of a preferred embodiment.

FIG. 4 shows a more detailed configuration of a second DMAC module 370. The DMAC core part CORE1 of the second DMAC module 370 has a configuration relatively similar to that of the DMAC core part CORE0 of the first DMAC module 350. Dissimilarities are in that a control register is provided with an area for setting a channel number under transfer control, and that an I/O control register (DMAEXG) 377 is provided with a clear bit for clearing a clear transfer request on a channel basis. On the other hand, an input-output control part I/O1 of the second DMAC module 370 has a configuration significantly different from that of the input-output control part I/O0 of the first DMAC module 350.

First, the input-output control part I/O1 of the second DMAC module 370 is provided with: a request queue RQ10 comprising a FIFO memory for holding channel numbers for which transfer requests were made, in the order of input; and a control logic circuit 390 that produces a signal for clearing the request queue RQ10, based on a DMA transfer request signal/TR and a channel identification code TRID inputted from external terminals and produces a DMA transfer completion signal/TDACK at completion of the DMA transfer. The input-output control part I/O0 of the first DMAC module 350 is not provided with such a request queue.

Second, the input-output control part I/O0 of the first DMAC module 350 is provided with terminals for inputting DMA transfer request signals DREQ correspondingly to the channels, while the input-output control part I/O1 of the second DMAC module 370 is provided with a terminal 401 for inputting a DMA transfer request signal/TR common to the n channels, and terminals 402 for inputting a channel identification code TRID-to specify a channel for which a transfer is requested. The number of the terminals 402 is two when n is 4, and three when n is 8.

The input-output control part I/O1 of the second DMAC module 370 has a terminal 403 common to the n channels as a terminal for outputting a DMA transfer completion signal/TDACK, and is provided with terminals 404 for outputting a channel identification code TAID for indicating a channel in which a transfer is completed. The number of the terminals 404 is two when n is 4, and three when n is 8.

In this embodiment, the terminal 401 for inputting the DMA transfer request signal/TR is also configured to function as a terminal for accepting a request to clear the request queue RQ10. Where the terminal accepts a request to clear the request queue RQ10, channel identification codes TRID inputted to the terminals 402 at that time are regarded as channels for which a transfer request is to be cleared. The terminal 403 for outputting a DMA transfer completion signal/TDACK is also configured to function as a terminal for accepting a request to read the state of the request queue RQ10. Where the terminal accepts a request to read the request queue RQ10, a code outputted from the terminals 404 are regarded as the number of transfer request channels held in the request queue RQ10.

Figure 5:
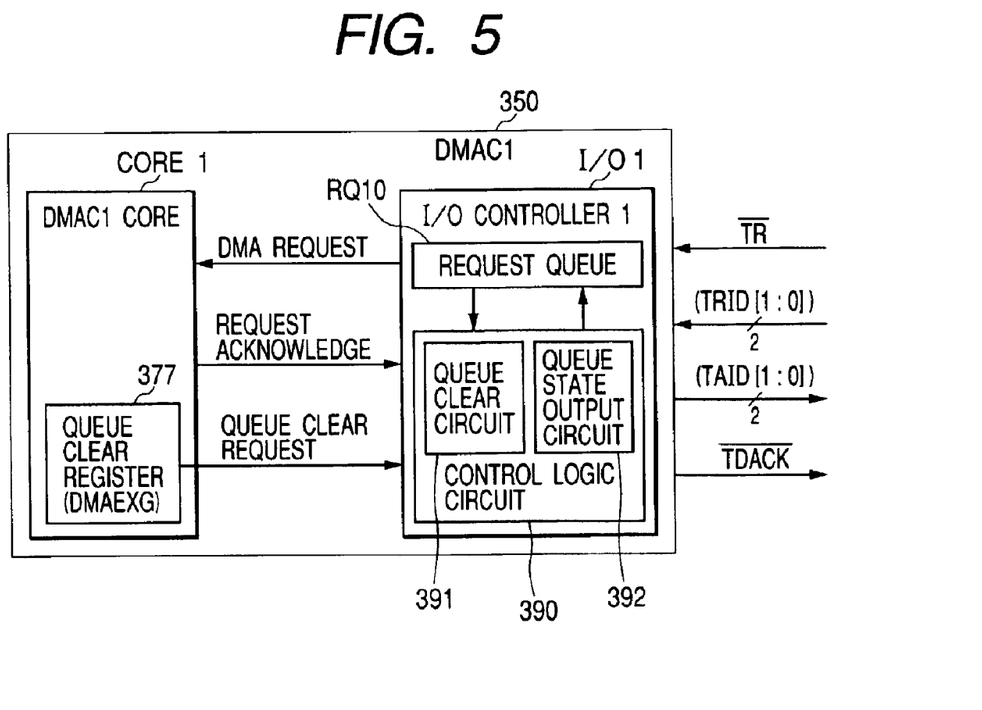
FIG. 5 is a block diagram schematically showing the configuration of an input-output control part constituting the second DMAC module of a preferred embodiment.

To clear the request queue RQ10 when a request to clear the request queue RQ10 is inputted to the input terminal 401, the control logic circuit 390, as shown in FIG. 5, is provided with a queue clear circuit 391 for producing a clear signal for the request queue RQ10, based on the input signals/TR and TRID, and a queue state output circuit 392 for outputting the number of transfer request channels left in the request queue RQ10, based on a queue state. As the queue state output circuit 392, for example, an encoder is conceivable which, for each queue of the request queue RQ10, encodes and outputs the state of a flag indicating whether an effective channel number is contained in the queue.

Furthermore, in this embodiment, the queue clear circuit 391 can produce a signal for clearing a DMA transfer request for a specified channel held in the request queue RQ10, based on the a clear bit provided in the I/O control register (DMACEXG) 377. Since the I/O control register (DMAEXG) 377 is a register that the CPU 111 can read and write through the internal bus ICB, transfer requests held in the request queue RQ10 can also be cleared by the CPU writing "1" to the clear bit of the I/O control register (DMAEXG) 377 according to a program.

Figure 6:
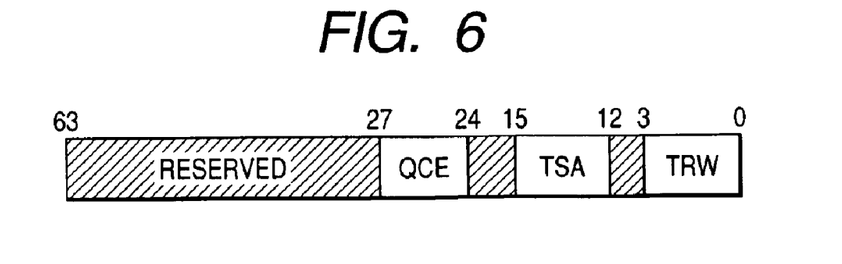
FIG. 6 is a diagram for explaining the bit configuration of an I/O control register of the DMAC module.

FIG. 6 shows the bit configuration of the I/O control register (DMAEXG) 377. In the drawing, QCE is a queue clear specification field which consists of as many bits as there are transfer channels; each bit corresponds to one of the transfer channels, and setting it to "1" causes a transfer request of a corresponding channel to be cleared. TSA is a field comprised of a collection of a bit for specifying whether a DMA transfer completion signal/TDACK is asserted high or low. TRW is a field comprised of a collection of a bit for specifying whether the DMA transfer completion signal/TDACK is asserted by a data transfer (read) from a source address or a data transfer (write) to a destination address. TSA and TRW are comprised of as many bits as there are transfer channels, respectively. The hatched portion is a reserved area consisting of null bits.

Figure 7:
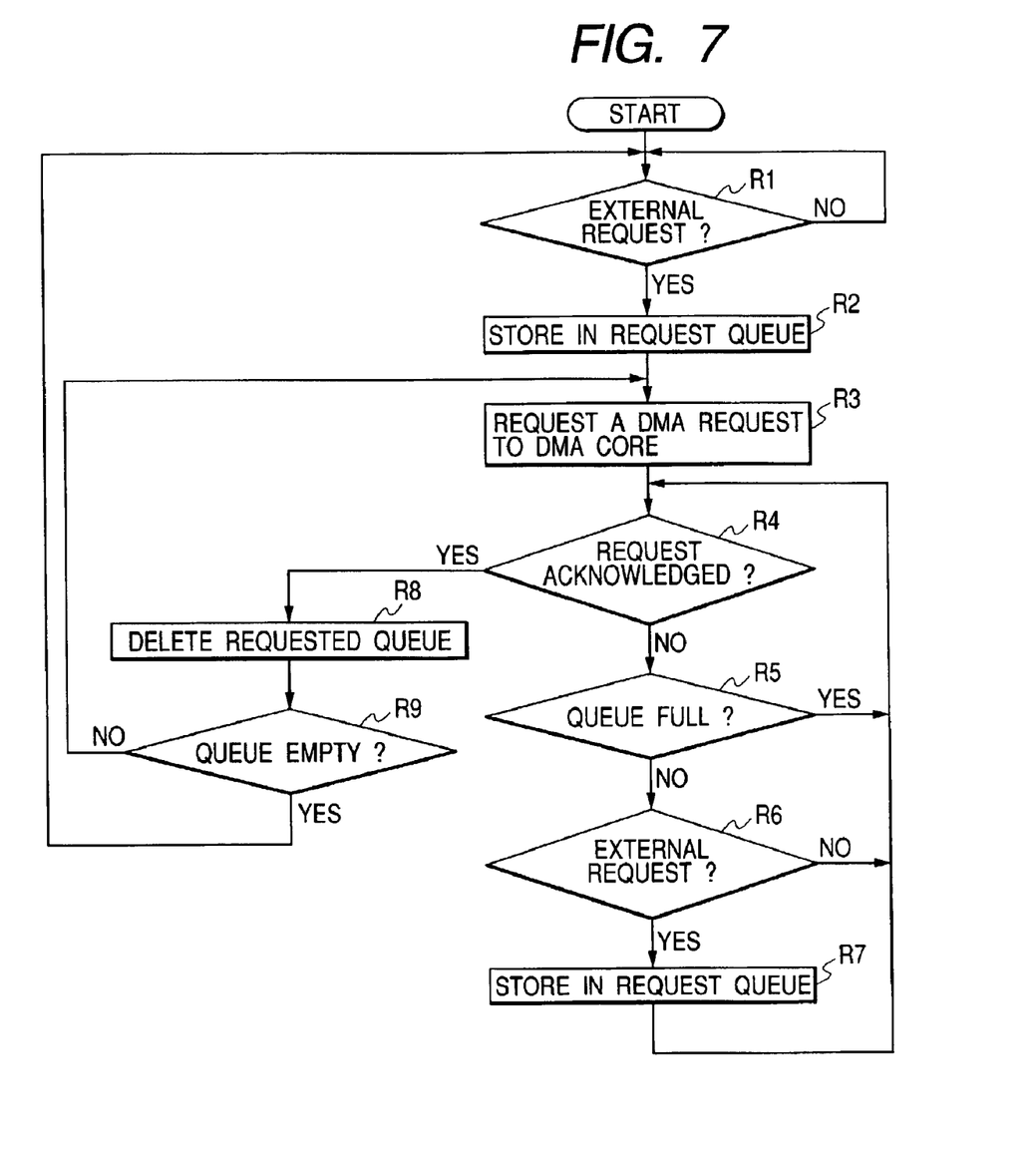
FIG. 7 is a processing flowchart showing the procedure for controlling request queues in an input-output control part of the DMAC module.
Figure 8:
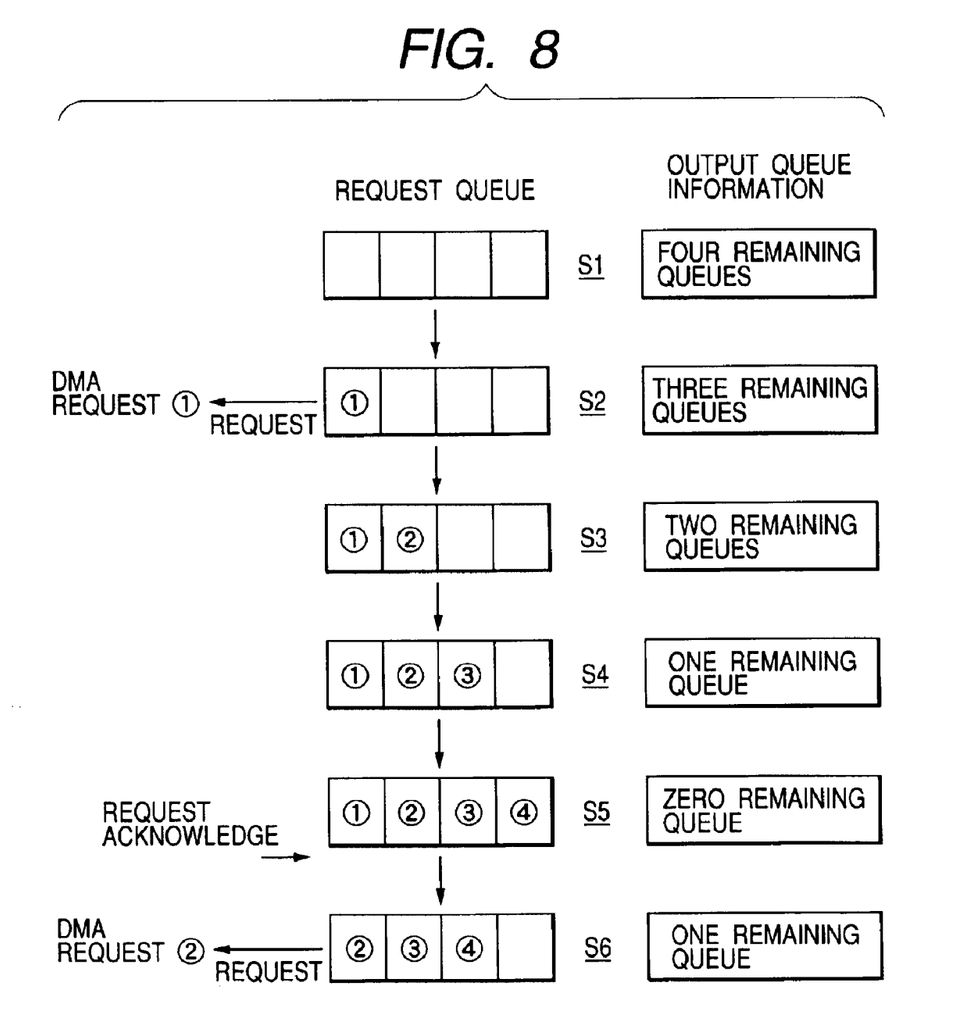
FIG. 8 is a state flowchart showing how an input-output control request queue of the DMAC module changes.

Next, a description is made of the procedure for controlling the request queue RQ10 by the control logic circuit 390 in the input-output control part I/O1 with reference to a processing flowchart of FIG. 7 and a state flowchart of FIG. 8.

The control logic circuit 390 monitors whether a DMA transfer request is made by a DMA transfer request signal/TR from the outside, and upon receipt of a DMA transfer request, stores a channel identification code TRID inputted to the terminal 402 at that time in the request queue RQ10 (routines R1→R2 in FIG. 7, and stages S1→S2 in FIG. 8). When the request has been stored in the request queue RQ10, the control logic circuit 390 issues a DMA transfer request for the requested channel to the DMA part CORE1 (routine R3 in FIG. 7 and stage S2 in FIG. 8).

Next, the control logic circuit 390 judges whether an acknowledge signal is returned from the DMA core part CORE 1 (R4 in FIG. 7). If there is no acknowledge signal, it judges whether the request queue RQ10 is full, and if not so, judges whether a next DMA transfer request arrives (routines R5 and R6 in FIG. 7). When the request queue RQ10 is full in the routine R5, and when there is no next transfer request in the routine R6, the control logic circuit 390 returns to the routine R4 to wait for arrival of an acknowledge signal. When there is a next transfer request in the routine R6, the control logic circuit 390 stores a channel identification code TRID inputted to the terminal 402 at that time in the request queue RQ10 (routine R7 in FIG. 7 and stage S3 in FIG. 8), and returns to the routine R1 again to repeat the above procedure. If third and fourth transfer requests arrive before an acknowledge signal is returned, the transfer requests are also stored in the request queue RQ10 (stages S4 and s5 in FIG. 8).

Thereafter, upon receiving an acknowledge signal from the DMA core part CORE1 in the routine R4, the control logic circuit 390 shifts to a routine R8 to delete the first transfer request held in the request queue RQ10. Then, the control logic circuit 390 judges in the next routine R9 whether the request queue RQ10 has become empty, and if empty, returns to the main routine, but when transfer requests still remain in the request queue RQ10, returns to the routine R3 to issue a DMA transfer request for a requested channel to the DMA core part CORE1 according to the next transfer request (stage S6 in FIG. 8).

Figure 9:
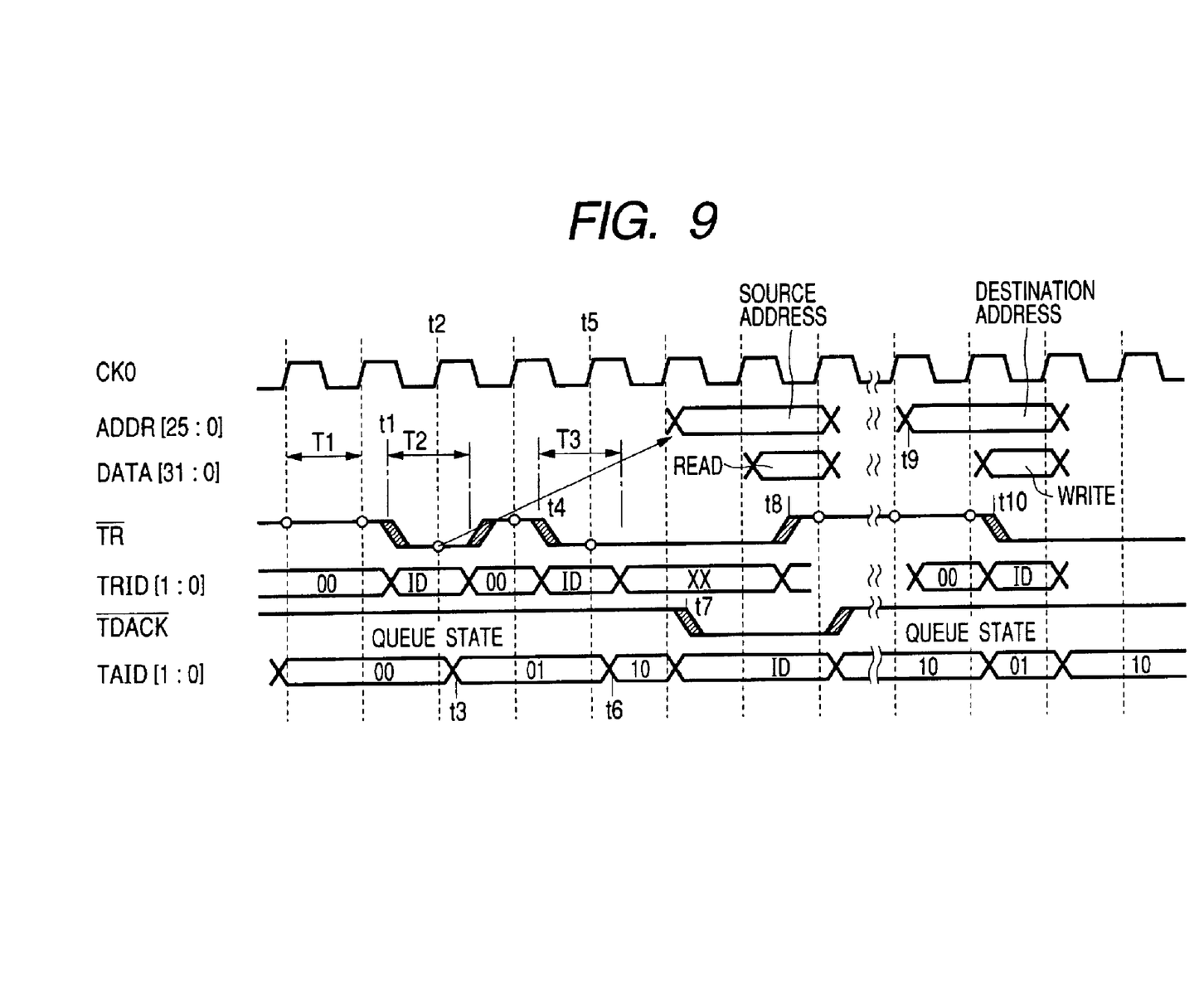
FIG. 9 is a timing chart showing the procedure of the acceptance of DMA transfer requests and the states of a request queue.

Next, the procedure for accepting DMAC transfer requests in the second DMAC module 370 and outputting the states of the request queue RQ10 are described using a timing chart of FIG. 9. FIG. 9 shows a processing timing in a case where no DMA transfer is in progress and a DMA transfer request is accepted when the request queue RQ10 is empty.

Since no DMA transfer is in progress, the input-output control part I/O1 negates a DMA transfer completion signal/TDACK to a high level. Since the request queue RQ10 is empty, the input-output control part I/O1 outputs as a signal TAID a code "00" to indicate that the queue is empty. When an external device issues a DMA transfer request to the second DMAC module 370 of the microprocessor of this embodiment, the input-output control part I/O1 inputs "00" as a channel identification code (channel number) TRID at a preceding cycle T1 and then asserts the DMA transfer request signal/TR to a low level (timing t1). The external device inputs the identification code TRID of the channel of which to request the transfer at the same time as the assertion of the DMA transfer request signal/TR (period T2). Even if "00" is inputted as a channel identification number TRID at the cycle T1, since the DMA transfer request signal/TR is a high level, TRID is not captured.

The input-output control part I/O1 captures the channel identification code TRID into the request queue RQ10 synchronously with the rising edge of the clock CK0 (timing t2). Thereafter, the input-output control part I/O1 outputs a code "01" as a signal TAID to indicate that there is one request in the queue (timing t3). The channel number captured into the request queue RQ10 is passed to a request controller 383 to set information indicating that a transfer request has been made in a control register 375 of the corresponding channel.

Where the external device further performs a data transfer, the DMA transfer request signal/TR is temporarily negated to a high level and "00" is inputted as the channel identification code TRID again before asserting the DMA transfer request signal/TR to a low level (timing t4). At the same time as the assertion, the external device inputs the identification code TRID of the channel of which to request a transfer (period T3). The input-output control part I/O1 captures the channel identification code TRID to the request queue RQ10 (timing t5). Thereafter, the input-output control part I/O1 outputs a code "10" as a signal TAID to indicate that there are two requests in the queue (timing t6).

On the other hand, in parallel with the above operation, since the DMA core part CORE1 has started DMA transfer control according to the first DMA transfer request and informs the input-output control part I/O1 of transfer start upon completion of preparations, the input-output control part I/O1 asserts the transfer completion signal/TDACK to a low level and outputs a code "00" indicating a channel under transfer processing as the signal TAID (timing t7). At this time, the DMA core part CORE1 outputs a source address onto the bus. Read data outputted onto the data bus from a device of transfer source is captured in the buffer 380 within the DMA core part CORE1 (timing t8). A source address, destination address, transfer count, transfer data size, and the like are set in the corresponding registers 371 to 378 by the CPU 111 before asserting the DMA transfer request signal/TR to a low level to input a transfer request.

Thereafter, at the termination of the reading of data of a transfer size set in a register, the DAM core part CORE1 outputs a destination address (timing t9), and data within the buffer 380 is outputted onto the data bus one clock cycle later to write the data to a device of transfer destination (timing t10). A code indicating a transfer channel during a transfer is outputted only for the duration of an access cycle (read access or write access by DAMC1) set in the TRW field of the DMAZEXG register 377, and thereafter, the input-output control part I/O1 negates the transfer completion signal/TDACK to a high level and outputs a code indicating a queue state as a signal TAID.

In this embodiment, the number of queues is four, and a code for indicating a queue state is 2 bits and "00" denotes that all of the four queues are empty. The code for indicating a queue state, when "01", indicates that the number of queues containing requests is one; when "10", indicates that the number of queues containing requests is two. When the number of queues containing requests is three or four, "11" is assigned as the code for indicating a queue state. This contributes to reduction in the number of external terminals for outputting a queue state. Generally, transfer request sides use the request queue RQ10 so that it does not become full, thereby providing some leeway for the queue. Therefore, when the number of queues containing requests is three or four, even if "11" is assigned as the code for indicating a queue state, there would be no major problem.

Figure 10:
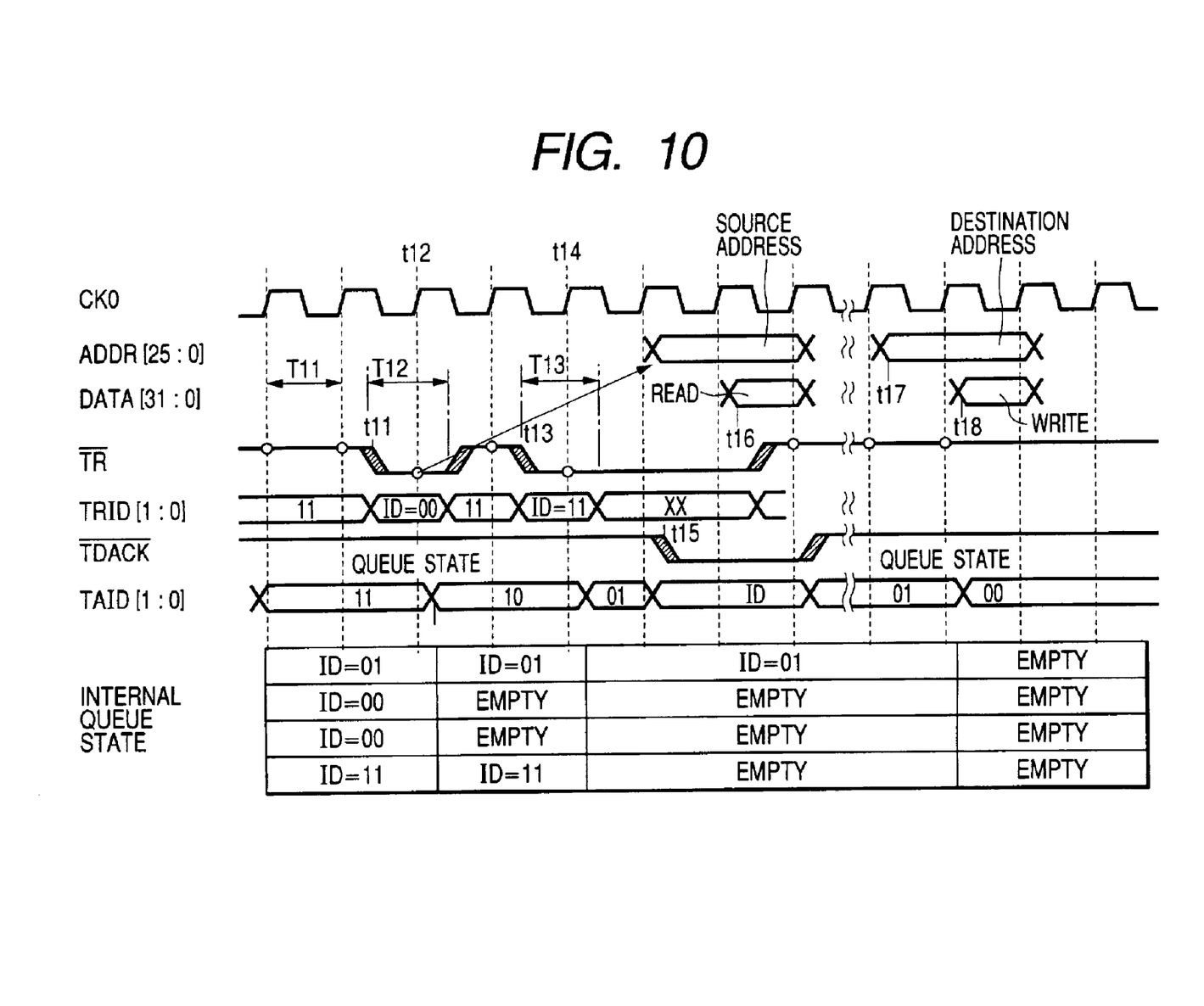
FIG. 10 is a timing chart showing the procedure for clearing transfer requests remaining in a request queue upon input of an external signal.

Next, the procedure by which the second DMAC module 370 clears transfer requests remaining in the request queue RQ10 upon input of a signal from the outside is described with reference to a timing chart of FIG. 10. Before proceeding to this operation, whether transfer requests remain in the request queue RQ10 can be recognized by checking the signal TAID indicating a queue state, outputted from the input-output control part I/O1. FIG. 10 shows a processing timing in a case where no DMA transfer is in progress and 01, 00, 00, and 11 are held as codes indicating transfer request channels in the request queue RQ10.

Since no DMA transfer is in progress, the input-output control part I/O1 negates a DMA transfer completion signal/TDACK to a high level. When an external device issues a request to clear the channels held in the request queue RQ10 to the second DMAC module 370 of the microprocessor of this embodiment, the input-output control part I/O1 inputs "11" as a channel identification code TRID at a preceding cycle T11 and then asserts the DMA transfer request signal/TR to a low level (timing t11). The external device inputs the identification code TRID (e.g., "00") of the channel of which to request the transfer at the same time as the assertion of the DMA transfer request signal/TR (period T2). Even if "11" is inputted as a channel identification number TRID at the cycle T11, since the DMA transfer request signal/TR is a high level, TRID is not captured.

The input-output control part I/O1 captures the channel identification code TRID into the queue clear circuit 391 synchronously with the rising edge of the clock CK0 (timing t12). Thereby, a transfer request of a specified channel (e.g., "00") within the request queue RQ10 is cleared. In the drawing, channel numbers contained in the second and third queues of the four queues are cleared to an empty state.

Where the external device further has the channels to clear transfer requests from, the DMA transfer request signal/TR is temporarily negated to a high level and "11" is inputted as the channel identification code TRID again before asserting the DMA transfer request signal/TR to a low level (timing T11). At the same time as the assertion, the external device inputs the identification code TRID (e.g., "11") of the channel to clear a transfer request from (period T13). The input-output control part I/O1 captures the channel identification code TRID to the queue clear circuit 391 (timing t14). Thereby, the transfer request of the specified channel (e.g., "11") within the request queue RQ10 is cleared. In the drawing, a channel number contained in the fourth queue of the four queues is cleared to an empty state.

In the example of FIG. 10, since a transfer request (channel "01") held in the first queue is not requested to be cleared, in parallel with the above described clear operation, the DMA core part CORE1 has started DMA transfer control according to a DMA transfer request for the channel "01" and informs the input-output control part I/O1 of transfer start upon completion of preparations. At this time, the input-output control part I/O1 asserts the transfer completion signal/TDACK to a low level and outputs a code "00" indicating a channel under transfer processing as the signal TAID (timing t15). The DMA core part CORE1 outputs a source address onto the bus. Read data outputted onto the data bus from a device of transfer source is captured in the buffer 380 within the DMA core part CORE1 (timing t16).

Thereafter, at the termination of the reading of data of a transfer size set in a register, the DAM core part CORE1 outputs a destination address (timing t17), and data within the buffer 380 is outputted onto the data bus one clock cycle later to write the data to a device of transfer destination (timing t18). A code indicating a transfer channel during a data transfer is outputted only for the duration of an access cycle (read access or write access by DAMC1) set in the TRW field of the DMAEXG register 377, and thereafter, the input-output control part I/O1 negates the transfer completion signal/TDACK to a high level and outputs a code indicating a queue state as a signal TAID. In FIG. 10, since all the queues become empty after the timing t18, the code for indicating a queue state is "00".

Figure 11:
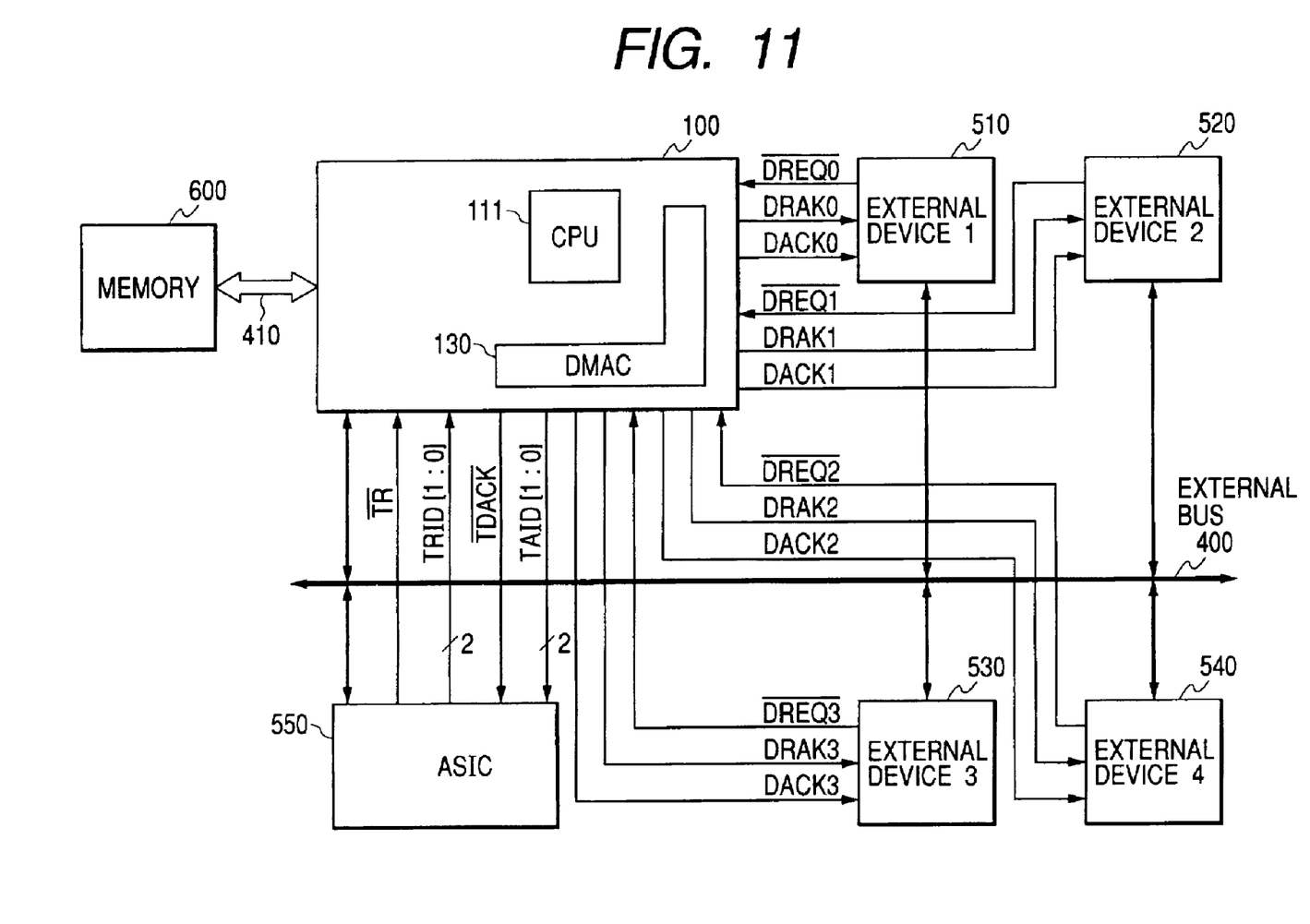
FIG. 11 is a block diagram showing a configuration of an application system of a microprocessor incorporating a DMA controller.

FIG. 11 shows a configuration of an application system of a microprocessor comprising the DMA controller 130 of the above described embodiments.

In FIG. 11, a microprocessor LSI 100 comprises CPU 111, CPU controller 130, and the like. To the microprocessor 100, external devices 1 to 4, namely, 510, 520, 530, and 540, and a system LSI 550 such as ASIC incorporating a circuit designed for DMA transfer are connected through external memory interfaces and an external bus 400. Although there is particular limitation, in this system, the external devices 1 to 4, namely, 510, 520, 530, and 540 are connected to the first DMAC module 350 of the DMA controller 130 and the ASIC 550 is connected to the second DMAC module 370. Furthermore, in the system of this embodiment, an external memory 600 such as synchronous DRAM is connected to the microprocessor 100 through the external memory bus 410. The DMA controller 130 can perform DMA transfers not only among the external devices 1 to 4, namely, 510 to 540, but also between the external devices 1 to 4, namely, 510 to 540, and the ASIC 550, between the external devices 1 to 4 510 to 540 and the external memory 600, and between the ASIC 550 and the external memory 600.

Although the invention made by the inventor has been described in detail based on preferred embodiments, it goes without saying that the present invention is not limited to the above described embodiments and may be modified in various ways without departing from the spirit and scope of the present invention. For example, although, in the above described embodiments, the request queue RQ10 for holding DMA transfer requests may be cleared by any of hardware and software, it may be cleared by only one of hardware and software.

Also, although, in the above described embodiments, the request queue RQ10 for holding DMA transfer requests is provided only for the DMAC module 370, request queues for each holding transfer requests for each channel may be provided within another DMAC module 350, and the request queues may be cleared by any of hardware and software or by hardware or software, and the state of each request queue may be outputted to the outside. In this case, signals indicating whether request queues are contained in the request queues may be outputted respectively, but these signals may be encoded and outputted to the outside.

Furthermore, in a case where the request queues are cleared by hardware, external terminals for directly inputting a clear signal from the outside of the chip may be provided. In this case, the input terminals may be provided to correspond one for one with the channels, or a decoder may be provided within the chip to input signals encoded in the outside.

Although, in the embodiments, the number of remaining transfer requests is outputted to the outside to indicate the state of the request queue, the contents of the request queue, that is, information about channels in which transfer requests remain may be outputted to the outside. In this case, it is desirable that the contents of the request queue is outputted as serial data.

The above description has been primarily made of application of the present invention to a microprocessor including a DMA controller, which is an application field of the present invention. The present invention is not limited to it and may also be applied to a DMA controller configured as an LSI distinct from the microprocessor.

Effects obtained by typical inventions of those disclosed by the present patent application are described briefly.

That is, according to the present invention, DMA transfer processing can be performed without retrying the setting of control registers and request queues can be cleared without performing unnecessary DMA transfers. As a result, system throughput is increased. Also, without providing a circuit such as a counter for counting an output count of DMA transfer requests, to peripheral devices as DMA transfer request sources, termination of DMA transfers is prevented with transfer requests remaining in the queues. This relieves the user of heavy design burden and prevents the system from becoming complicated.

What is claimed is:

1. A data transfer control circuit, comprising:
 a plurality of queues holding plural data transfer requests; and
 a plurality of channels,
 wherein the data transfer control circuit is capable of controlling data transfers between a memory and peripheral circuits or peripheral devices according to said plurality of channels,
 wherein states of said queues are outputted from at least one external terminal coupled to the data transfer control circuit, and
 wherein the data transfer control circuit is capable of outputting identification information, of a channel involved in an executed data transfer, using said at least one terminal.

2. The data transfer control circuit according to claim 1, wherein the data transfer control circuit includes a register in which identification information of channels to be cleared from the queues can be set according to a program, and when channel identification information has been set in the register, the set channel identification information is deleted from the queues or nullified.

3. The data transfer control circuit according to claim 1, wherein the states of said queues include information regarding a number of data transfer requests remaining in said queues.

4. The data transfer control circuit according to claim 1, wherein the states of said queues are outputted from the at least one external terminal by a signal produced by encoding a signal indicating the states of said queues.

5. A data transfer control circuit that controls data transfers between a memory and peripheral circuits or peripheral devices without involvement of a central processing unit,
 wherein the data transfer control circuit includes a plurality of queues, which hold plural data transfer requests, and a plurality of channels,
 wherein data transfer control can be performed according to said plurality of channels,
 wherein said queues are capable of holding identification information of channels involved in data transfer requests,
 wherein an arbitrary one of said queues can be cleared,
 wherein the data transfer control circuit is coupled to a first external terminal for inputting a signal for clearing the arbitrary one of said queues, and
 wherein the data transfer control circuit is capable of inputting a signal requesting a data transfer using said first external terminal.

6. The data transfer control circuit according to claim 5, wherein the data transfer control circuit is coupled to at least one second external terminal for inputting the identification information of channels involved in data transfer requests, and
 wherein when the signal for clearing the arbitrary one of the queues is inputted using said first external terminal, the identification information of the channel to be cleared is inputted using the at least one second external terminal.

7. A data transfer control circuit that controls data transfers between a memory and peripheral circuits or peripheral devices without involvement of a central processing unit, wherein data transfer control can be performed according to a plurality of channels, and queues capable of holding identification information of plural channels involved in data transfer requests are provided, wherein contents of the queues can be cleared, and wherein the data transfer control circuit includes at least one external terminal for inputting the identification information of channels involved in data transfer requests, and when a signal for clearing contents of the queues is inputted, the identification information of a channel to be cleared can be inputted using the at least one external terminal.

8. A data transfer control circuit that controls data transfers between a memory and peripheral circuits or peripheral devices without involvement of a central processing unit, wherein data transfer control can be performed according to a plurality of channels, and queues capable of holding identification information of plural channels involved in data transfer requests are provided, wherein contents of the queues can be cleared, wherein the data transfer control circuit includes a first external terminal for inputting a signal for clearing contents of the queues, wherein the data transfer control circuit includes at least one second external terminal for inputting the identification information of channels involved in data transfer requests, and wherein when the signal for clearing the contents of the queues is inputted, the identification information of a channel to be cleared can be inputted using the at least one second external terminal.

9. A data transfer control circuit, comprising:

a plurality of queues holding plural data transfer requests; and a plurality of channels, wherein the data transfer control circuit is capable of controlling data transfers between a memory and peripheral circuits or peripheral devices according to said plurality of channels, wherein said queues are capable of holding identification information of channels involved in data transfer requests, wherein an arbitrary one of the plural data transfer requests held in said queues can be cleared, wherein the data transfer control circuit is coupled to a first terminal capable of inputting a data transfer request and to at least one second terminal capable of inputting the identification information of channels involved in data transfer requests, and wherein, in a first state of the data transfer control circuit, a first signal for clearing the arbitrary one of the plural data transfer requests held in the queues is inputted via said first terminal, wherein, in a second state of the data transfer control circuit, a second signal for requesting a data transfer is inputted via said if first terminal, and wherein, in said first state, the identification information of a channel to be cleared is inputted using the at least one second terminal in response to said first signal.

* * * * *